(12) United States Patent
Cheong et al.

(10) Patent No.: US 7,978,911 B2
(45) Date of Patent: Jul. 12, 2011

(54) METHOD OF CLASSIFYING COLORS OF COLOR BASED IMAGE CODE

(75) Inventors: Cheol Ho Cheong, Seoul (KR); Tack Don Han, Seoul (KR); Sang Yong Lee, Seoul (KR)

(73) Assignees: Colorzip Media, Inc., Seoul (KR); Colorzip Technology Co., Ltd., Seoul (KR)

( * ) Notice: Subject to any disclaimer, the term of this patent is extended or adjusted under 35 U.S.C. 154(b) by 1027 days.

(21) Appl. No.: 11/812,304

(22) Filed: Jun. 18, 2007

(65) Prior Publication Data
US 2008/0298688 A1    Dec. 4, 2008

(30) Foreign Application Priority Data

Jun. 23, 2006 (KR) .................. 10-2006-0057093
Apr. 6, 2007 (KR) .................. 10-2007-0034428

(51) Int. Cl.
*G06K 9/00* (2006.01)
*G06K 7/00* (2006.01)
(52) U.S. Cl. ................... 382/164; 235/462.04
(58) Field of Classification Search .......... 382/164; 235/462.04
See application file for complete search history.

(56) References Cited

U.S. PATENT DOCUMENTS

| | | | | |
|---|---|---|---|---|
| 5,233,684 A | * | 8/1993 | Ulichney | 345/604 |
| 6,459,419 B1 | * | 10/2002 | Matsubayashi | 345/156 |
| 6,721,447 B1 | * | 4/2004 | Kim et al. | 382/162 |
| 6,902,113 B2 | * | 6/2005 | Sali et al. | 235/462.04 |
| 2002/0196350 A1 | * | 12/2002 | Cooper | 348/223.1 |

FOREIGN PATENT DOCUMENTS

| | | |
|---|---|---|
| JP | 6-111084 A | 4/1994 |
| JP | 07-322009 | 12/1995 |
| JP | 2000-322531 A | 11/2000 |
| JP | 2004-355122 | 12/2004 |
| JP | 2005/509223 | 4/2005 |
| JP | 2005-208843 A | 8/2005 |
| KR | 10-2005-0051029 A | 6/2005 |
| WO | WO 0186582 A1 | 11/2001 |
| WO | 2006/009300 | 1/2006 |

OTHER PUBLICATIONS

CW Ngo, TC Pong, HJ Zhang, On clustering and retrieval of video shots, Oct. 2001International Multimedia Conference; vol. 9-ACM Multimedia, p. 51-60.*

(Continued)

*Primary Examiner* — Vikkram Bali
*Assistant Examiner* — Haris Bajwa
(74) *Attorney, Agent, or Firm* — Nixon & Vanderhye PC

(57) ABSTRACT

Provided is a method of classifying colors of a color based image code. The colors of each cell forming the color based image code are classified by sampling a predetermined number of pixels from each cell and then applying a max channel based clustering method, a white balance based color clustering method, a single-linkage algorithm based color classification method, a K-means algorithm based color classification method, or the like. Accordingly, the colors of an image code can be accurately recognized despite of a color distortion due to characteristics of a camera, a printing medium, etc.

16 Claims, 11 Drawing Sheets

OTHER PUBLICATIONS

Jia Wang, wen-jann Yang and Raj Acharya, Color Clustering Techniques for Color-content-Based Image Rertrieval from image Databases, Jun. 1997, IEEE.*

Stephen C. johnson, Hirearchical clustering Schemes, Sep. 1967, Psychometrika—vol. 32, No. 3.*

European International Search Report dated Nov. 7, 2008 for EP 06 81 2357.

Office Action dated Nov. 18, 2008 from the European Patent Office. (XP002501544) Yves; "QR codes are so 2004. Get Ready for ColorCode"; Apr. 22, 2005, pp. 1-7.

(XP011193879) Kato H. et al.: "Pervasive 2D Barcodes for Camera Phone Applications"; IEEE Pervasive Computing, IEEE Service Center, Los Alamitos, CA, US, vol. 6, No. 4, Oct. 1, 2007, pp. 76-85.

(XP010750825) Ohbuchi E. et al.: "Barcode Readers using the Camera Device in Mobile Phones", Cyberworlds, 2004 International Conference on Tokyo, Japan, Nov. 18-20, 2004, Piscataway, NJ, USA, IEEE, Nov. 18, 2004, pp. 260-265.

Korean International Search Report dated Oct. 2, 2007 from Korean Intellectual Property Office for PCT/KR2007003039.

Japanese Office Action for Application No. 2007-165234, dated Nov. 16, 2009.

* cited by examiner

FIG. 1 (PRIOR ART)
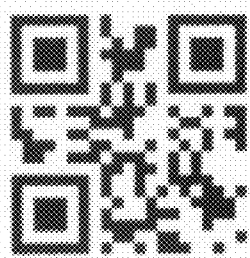 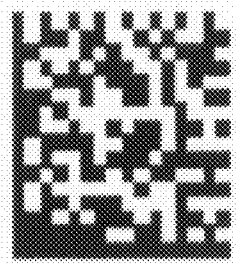 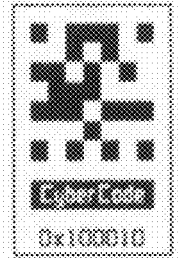 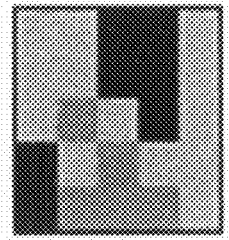
QR Code Data Matrix Cyber Code Color Code
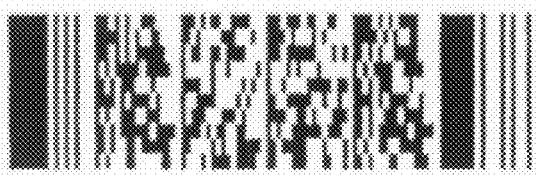 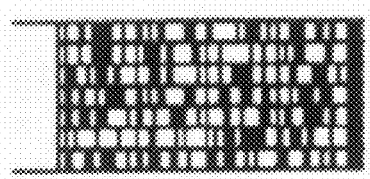
PDF-417 Code 49

| Cells | Symbols | Colors | Size (minimum) | Parity types | # of unique patterns |
|---|---|---|---|---|---|
| 5 x 5 | | 4 | 5mm x 5mm | 4 | 17 billion ($4^{17}$) |
| 5 x 8 | | 4 | 5mm x 8mm | 1 | 72,057 trillion ($4^{28}$) |

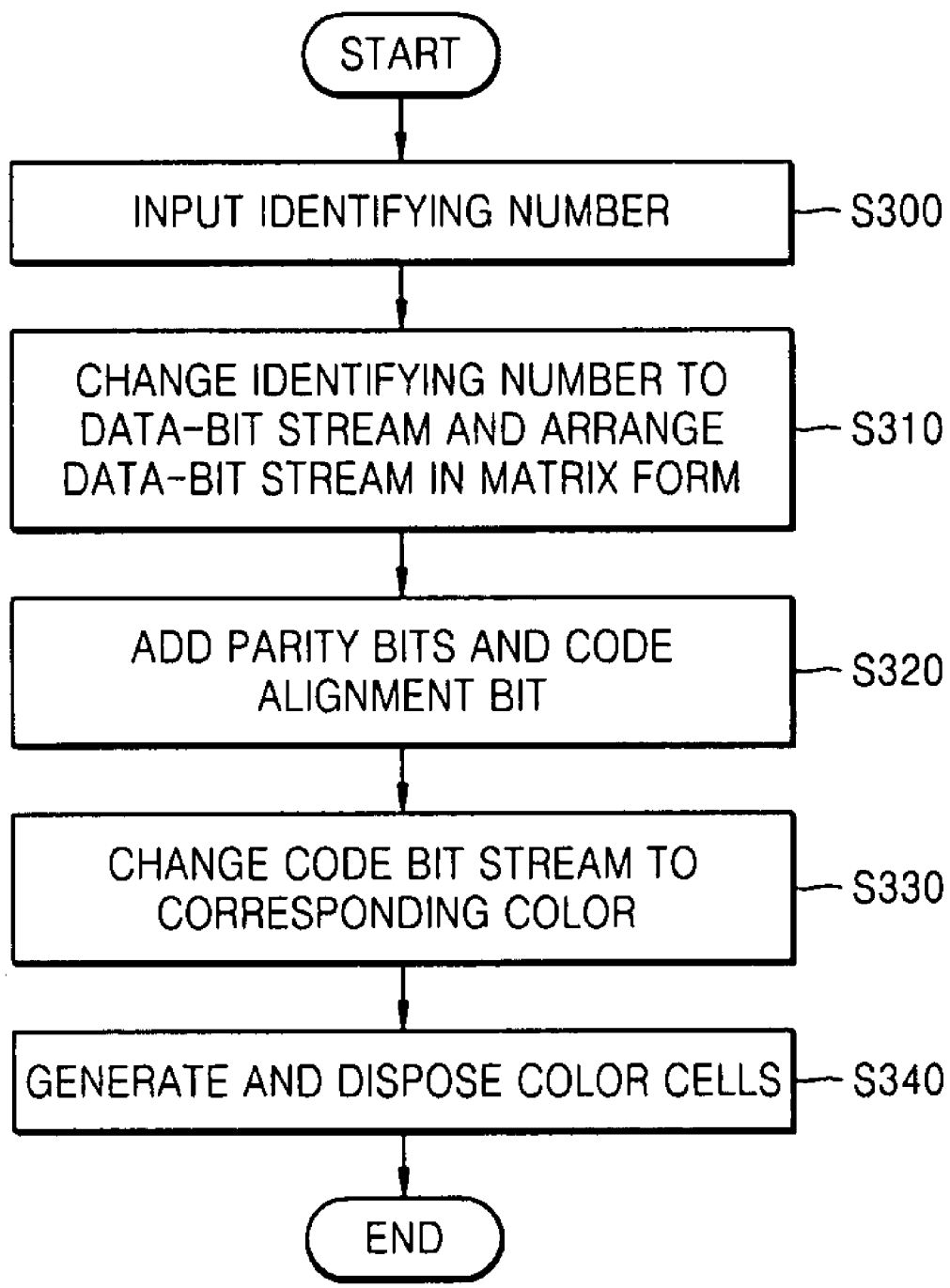

METHOD OF CLASSIFYING COLORS OF COLOR BASED IMAGE CODE

CROSS-REFERENCE TO RELATED PATENT APPLICATION

This application claims the benefit of Korean Patent Application No. 10-2006-0057093, filed on Jun. 23, 2006, and Korean Patent Application No. 10-2007-0034428, filed on Apr. 6, 2007 in the Korean Intellectual Property Office, the disclosures of which are incorporated herein in their entirety by reference.

BACKGROUND OF THE INVENTION

1. Field of the Invention

The present invention relates to a method of decoding a color based image code, and more particularly, to a method of classifying a color of each cell of an image code during a decoding process.

2. Description of the Related Art

For the past decade, an augmented reality and a mixed reality service using black and white patterned barcodes, and commercial services, such as mobile commerce, have been researched. Recently, a color based image code, such as a color code, for a mobile computer has been suggested. However, the colors of color cells forming the color based image code change depending on the lighting, printing media, and conventional cameras, and thus, it is difficult to recognize the color based image code as compared to a black and white markers.

Recent researches have focused on a user interface that provides data or services in a virtual world to a user by embedding tag media in a physical object and recognizing the physical object using a reader. Tag media used in a tangible user interface can be divided into a wireless tag, such as a radio frequency identification (RFID), and an image code, such as a barcode. Specifically, an interface, which provides service by recognizing an image of an image code or a marker, is called a paper user interface (PUI). Such interface method is used in studying an augmented reality and a mixed reality service, and commercial services, such as a personal information management service (PIMS), advertisement service, mobile commerce, etc. using a mobile phone.

An image code and a marker can be divided into a 1D barcode and a 2D code. The 1D barcode illustrates identifying numbers, checksum digits, and guide bars using pattern information in black and white bars. The 2D code has an error correction capacity using security information since the 2D code can store a larger amount of data than the 1D barcode. FIG. 1 is a diagram of examples of 2D codes from among conventional color based image codes.

A conventional terminal used in a mobile computing environment is formed with a low capacity memory, a low performance processor, and a conventional user built-in camera, and thus, the conventional terminal has following constraints in terms of recognizing an image.

First, a PUI should be able to be used under various lighting in everyday life. Second, a recognition algorithm should be simple and quick and third, an image should be recognized using a low performance camera. Examples of a 2D code considering such constraints include a cyber code, a quick response (QR) code limiting the number of cells, and a color code where, a barcode, the cyber code, and the QR code are formed of black and white cells as patterns, and the color code is a color based image code.

Most codes are black and white since black and white can be easily recognized as compared to other colors. However, as color media becomes popularized, a color based image code, which is media-friendly and requires large data storage capacity as compared to a conventional black and white code, has come into the spotlight.

In color based image codes such as a color code, an identifier is encoded using colors, and error verification and direction detection functions using double parity technology are provided. An algorithm of decoding a color code is very simple and efficient against a blur phenomenon since data is represented not in terms of a length pattern of cells, however, in color cells having the same size. However, a color change in a color based image code, such as a color code in a mobile computing environment according to various lighting, camera characteristics, and printing media characteristics makes it difficult to recognize the color based image code.

SUMMARY OF THE INVENTION

The present invention provides a method of classifying colors to accurately and easily recognize colors of each cell of a color based image code even when the colors change according to characteristics of a camera, a printing medium, etc.

The present invention also provides a computer readable recording medium having recorded thereon a program for executing a method of classifying colors of a color based image code.

According to an aspect of the present invention, there is provided a method of classifying colors of a color based image code, the method including: sampling a predetermined number of pixels from each cell forming the color based image code; recognizing a color of a color channel having the biggest value from among color channels forming each sampled pixel as a color of each sampled pixel; and classifying a color having the highest frequency from among the colors of the pixels sampled from each cell as a color of the cell.

According to another aspect of the present invention, there is provided a method of classifying colors of a color based image code, the method including: sampling a predetermined number of pixels from a quiet zone of the color based image code; obtaining an average brightness value of the sampled number of pixels; compensating an average value of the color channels of each cell forming the color based image code using the average brightness value; and changing the compensated average value of the color channels of each cell to a color model capable of hue extraction, and classifying a color of each cell based on intensity and hue values of the color model capable of hue extraction.

According to another aspect of the present invention, there is provided A method of classifying colors of a color based image code, the method including: obtaining at least one of a brightness value and a saturation value of each cell forming the color based image code and grouping the cells into an achromatic color group and a chromatic color group based on the at least one of the brightness value and the saturation value; and classifying colors of cells in the chromatic color group using a hue of a color model capable of hue extraction.

Accordingly, colors of the color based image code can be classified despite of color changes according to various environments.

BRIEF DESCRIPTION OF THE DRAWINGS

The above and other features and advantages of the present invention will become more apparent by describing in detail exemplary embodiments thereof with reference to the attached drawings in which:

FIG. 1 is a diagram of examples of 2D codes from among conventional color based image codes;

FIG. 3 is a flowchart of a method of encoding a color code according to an embodiment of the present invention;

DETAILED DESCRIPTION OF THE INVENTION

Hereinafter, the present invention will be described more fully with reference to the accompanying drawings, in which exemplary embodiments of the invention are shown.

Figures 2A, 2B:
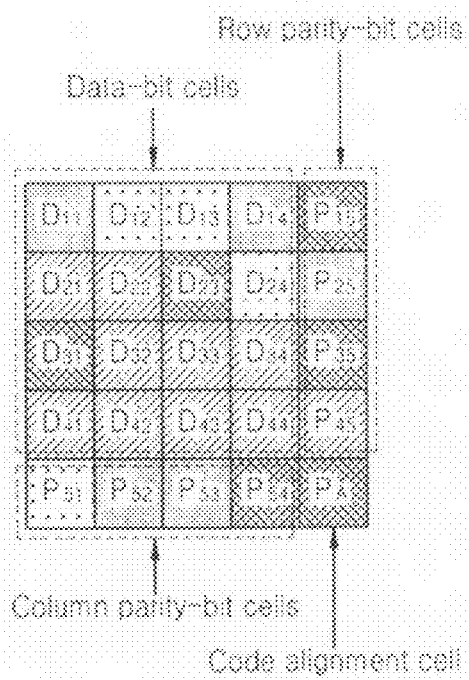
FIG. 2A is a diagram of an example of a color code from among color based image codes used in the present invention.
FIG. 2B is a table showing the characteristics of a color code used in the present invention.

FIG. 2A is a diagram of an example of a color code from among color based image codes used in the present invention and FIG. 2B is a table showing the characteristics of a color code.

Conventionally, an ARToolKit marker and a planner marker, which are used in an augmented reality service, have a simple code structure in a dynamic mobile computing environment and require a small number of operations for decoding, however, can store a very small amount of information. However, a commercial 2D code can store a large amount of information, however, requires a high performance camera in order to be recognized and a large number of operations, and thus, is not suitable in a dynamic mobile computing environment.

Referring to FIGS. 2A and 2B, the color code is a 2D matrix type code formed of color cells. In case of a color code for a mobile computer, one cell represents 2 bits, and accordingly, information is encoded in 4 colors. A service of the color code can be changed by only modifying contents of a database that is connected online. Also, unlike other 2D codes, the color code is suitable in a mobile computing environment since the color code can be recognized via a conventional camera built in a mobile phone or a PDA, and not via a scanner for exclusively scanning the color code. The color code can be used in both an augmented reality service and a code service for online applications because the code structure is simple, the number of operations required is small, and colors are used, and thus, has a large amount of information.

The color code is formed of data-bit cells, parity-bit cells, and a code alignment cell. A bit stream representing an identifying number is arranged in the data-bit cells. A parity operation is performed along the column and row of the data-bit cells, and parity bits, derived from the parity operation, are disposed on the right side and bottom of the color code. The code alignment cell is disposed on the right bottom of the color code. The code alignment cell can distinguish a parity operation methods on a column and row from another column and row by taking the reciprocal of a column and row parities, and can be used as a basis for aligning the cells during a decoding process.

In FIG. 2A, the data-bit cells are $D_{11}$ through $D_{44}$, the parity-bit cells are $P_{15}$, $P_{25}$ through $P_{45}$, $P_{51}$, and $P_{52}$ through $P_{54}$. Also, $P_A$ is the code alignment cell. Since white is not used in the color code, a boundary for searching for a code area is not required, however, a white quiet zone with a thickness of 1 cell may exist around the color code in order to distinguish the color code from neighboring noise. The number of patterns that can be represented change according to the number of columns and rows of the color code and the number of parity methods.

FIG. 3 is a flowchart of a method of encoding a color code according to an embodiment of the present invention.

Referring to FIG. 3, when an encoder receives an identifying number in operation S300, the encoder changes the identifying number to a data-bit stream and arranges the data-bit stream in a matrix form in operation S310. In operation S320, the encoder calculates and adds parity bits of each column and row for an error correction, and generates and adds a code alignment bit using the parity bits. When a code-bit stream including the parity bits, etc. is complete, the encoder changes each code-bit stream to a corresponding color in operation S330 and generates and aligns color cells formed of the colors in operation S340.

Figure 4:
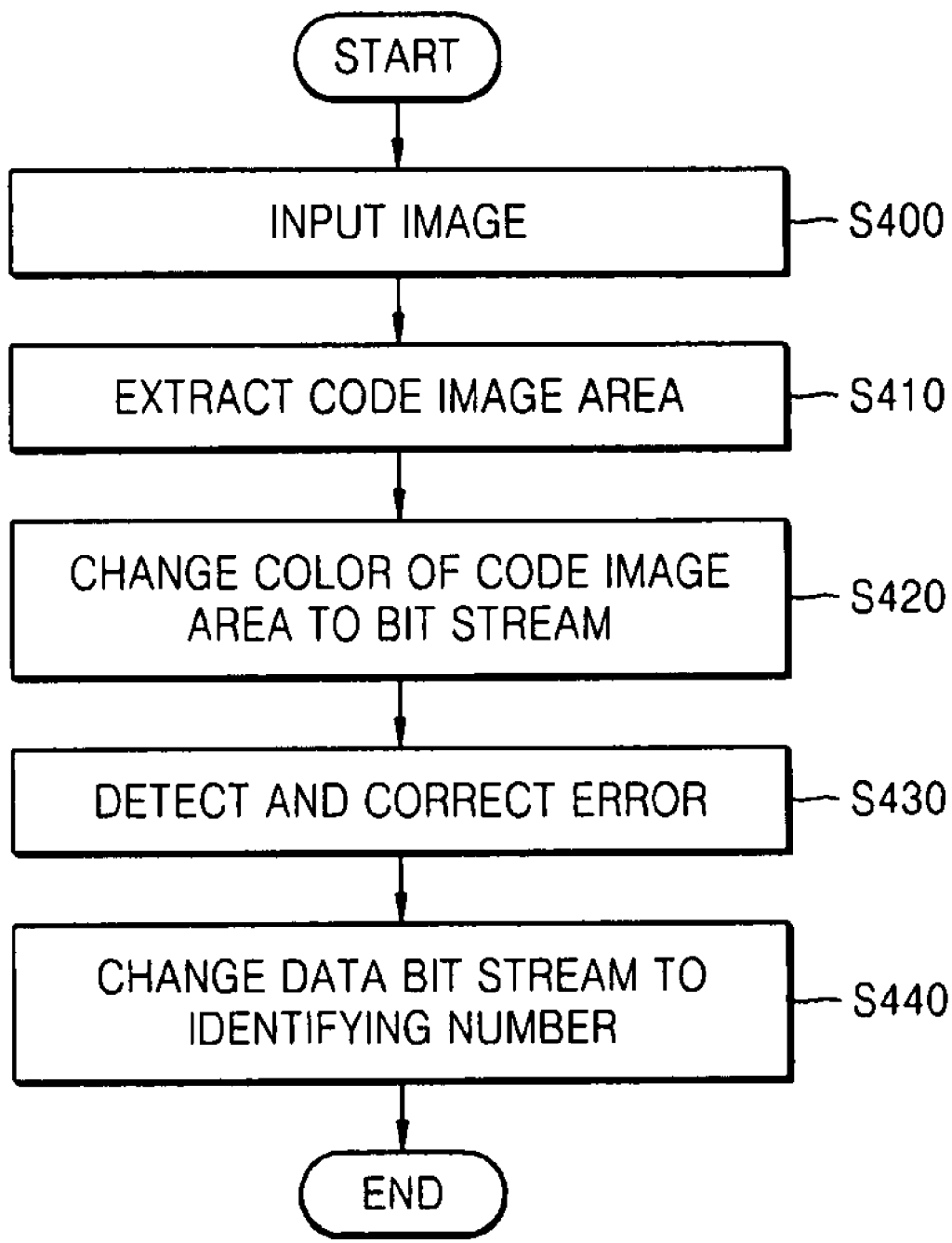
FIG. 4 is a flowchart of a method of decoding a color code according to an embodiment of the present invention.

FIG. 4 is a flowchart of a method of decoding a color code according to an embodiment of the present invention.

Referring to FIG. 4, a decoder receives an original image including a color based image code from a camera in operation S400. The decoder extracts a code image area from the original image in order to read color cells in operation S410, and changes the color cells to a corresponding bit stream in operation S420. The decoder detects and corrects an error by performing a parity operation in operation S430. Then, the decoder obtains a code alignment bit, aligns data bit streams referring to the location of the code alignment bit, and extracts an identifying number in operation S440. Also, an additional color code pattern can be obtained by combining the data bit streams and types of parity operations.

Figure 5:
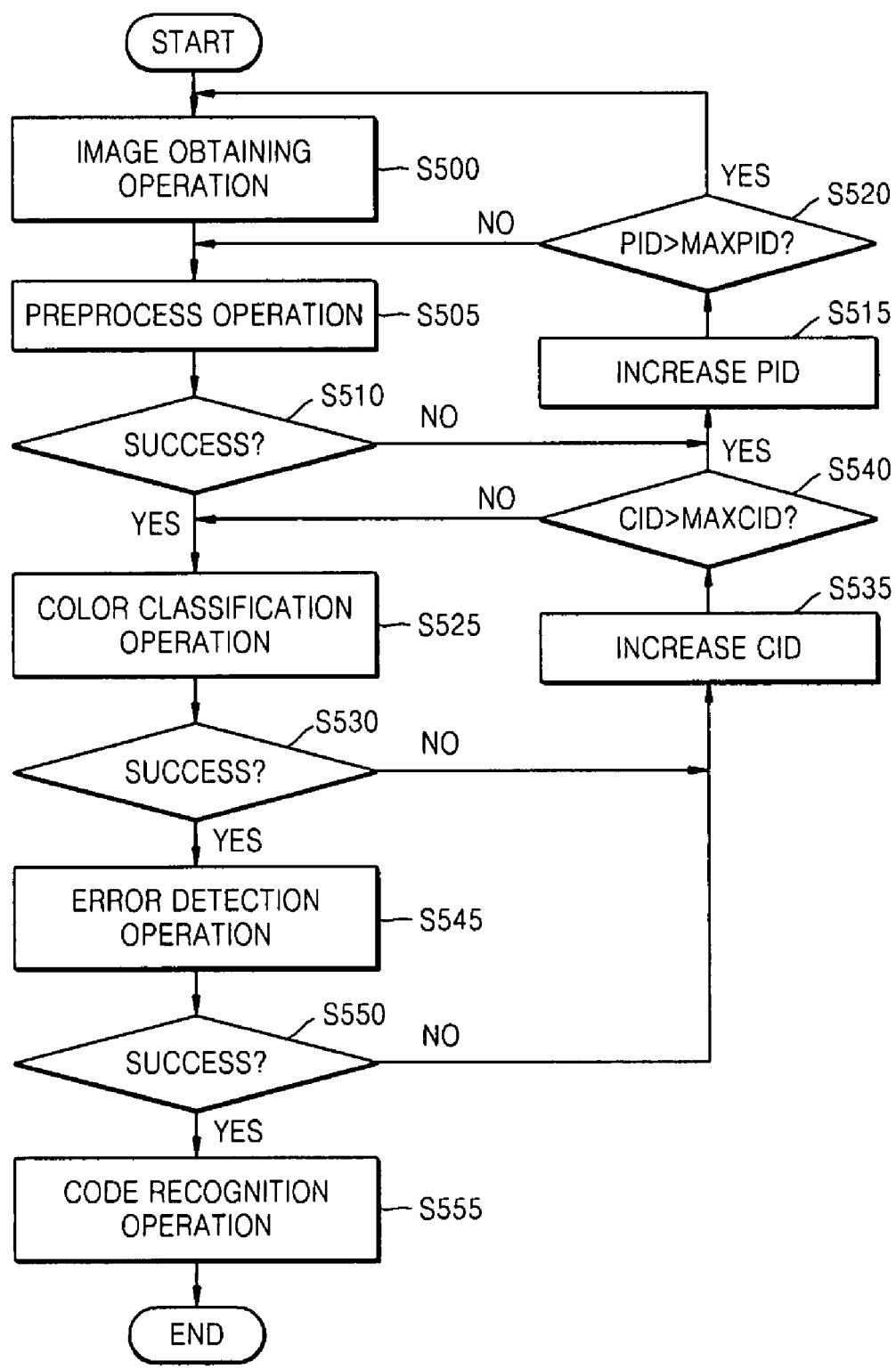
FIG. 5 is a flowchart of a method of decoding a color based image code according to an embodiment of the present invention.

FIG. 5 is a flowchart of a method of decoding a color based image code according to an embodiment of the present invention.

Referring to FIG. 5, the method includes an image obtaining operation S500, a preprocess operation S505, a color classification operation S525, an error detection operation S545, and a code recognition operation S555. The decoder includes parameters in terms of a preprocessing method identifier (PID) that sets a type of preprocessing method used in the preprocess operation S505, and a color cell classification method identifier (CID) that sets a type of color classification method in the color classification operation S525. The decoder decodes the color based image code by sequentially applying the methods set by the parameters.

In the image obtaining operation S500, an image that is represented physically or electrically is obtained. The image may be printed on a physical medium, such as a paper, a metal, or a plastic, or displayed on a display, such as a liquid crystal display (LCD) of a mobile phone, a monitor, a TV, or a beam projector. Also, the image may be provided in an electrical form, such as a bit stream, or an electronic file form.

In order to read the image printed on the physical medium, an image input device, such as a camera phone, a scanner, a digital camera, a PC camera, or a fax machine, is used. Also, the image, represented in a bit stream or an electronic file form, is obtained via a network or a storage device.

Hence, an output signal during the image obtaining operation S500 will be referred to as an original image, which is formed in an image file that can be processed in a computer. The original image includes noise or a background with a code image including code information. Conventionally, color and form of the code image in the original image are distorted by lighting, a medium in which the code image is shown, and a reader, which reads the code image.

If the image is received in the image obtaining operation S500, the received image is preprocessed in the preprocess operation S505. If the code image is not extracted in operation S510, a PID is increased in operation S515 and the image is preprocessed again in the preprocess operation S505. If a maximum number of preprocessing methods are all performed in operation S520, that is, the PID is greater than a maximum preprocessing method identifier (MAXPID), it is determined that the image is improper, and thus, the image is received again in the image obtaining operation S500. If a color is not able to be classified in operation S530 during the color classification operation S525, or if an error occurs in operation S550 during the error detection operation S545 even if the color is classified in operation 530, a CID is increased in operation S535 and a corresponding color classification algorithm is performed in the color classification operation S525. If a maximum number of color classification methods are all performed, that is, the CID is greater than a maximum color cell classification method identifier (MAX-CID), and the color is not able to be classified in operation S540, the preprocess operation S505 is performed again. In the error detection operation S545, the decoder performs a parity operation and detects an error from a bit stream of a color code. If an error is not detected, an identifying number is outputted and if an error is detected in operation S550, the color classification operation S525 is performed again.

Figure 6:
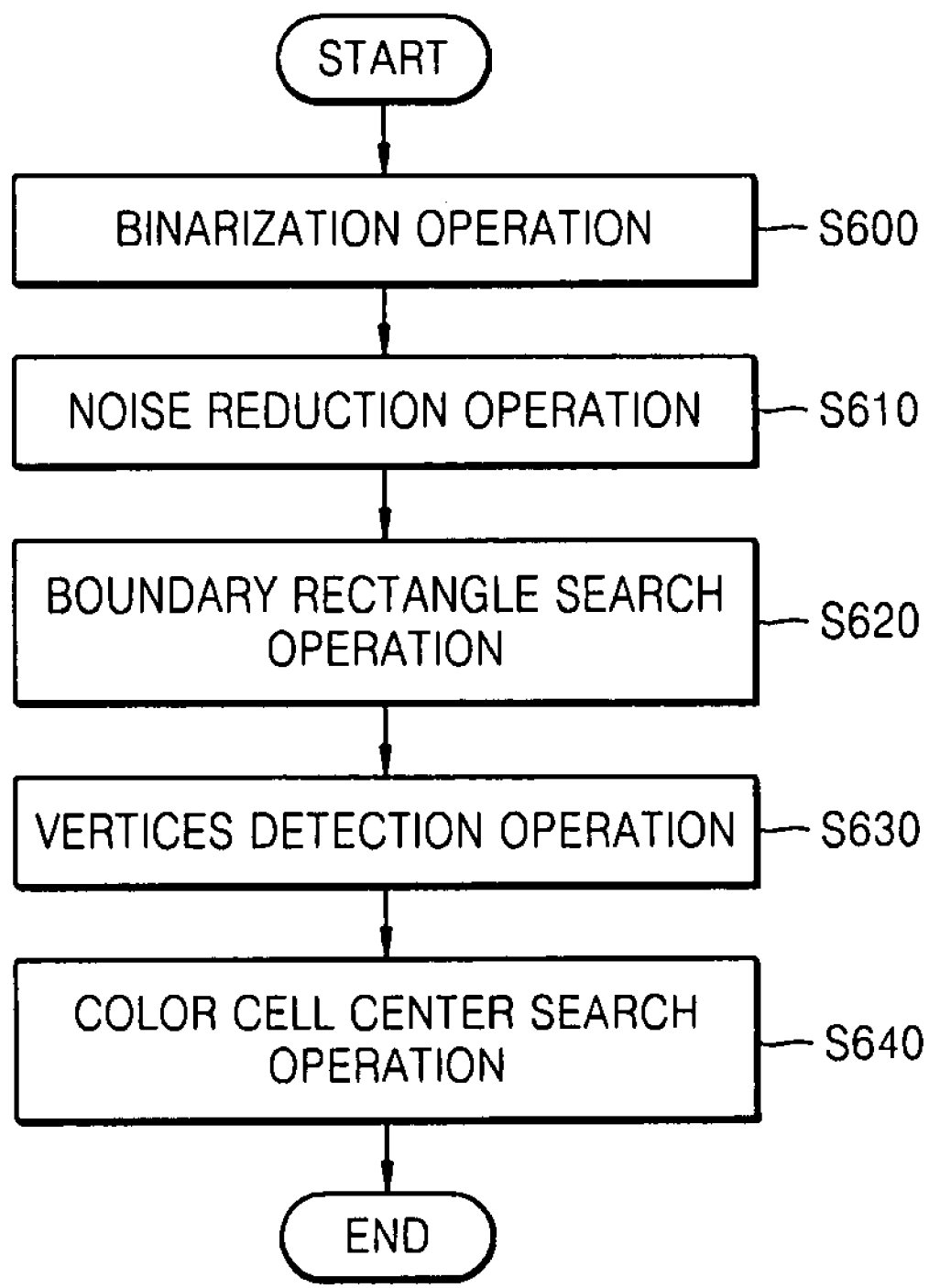
FIG. 6 is a flowchart of a preprocess operation of the method of decoding a color based image code, according to an embodiment of the present invention.

FIG. 6 is a flowchart of the preprocess operation S505 of the method of decoding a color based image code illustrated in FIG. 5, according to an embodiment of the present invention.

The preprocess operation S505 of FIG. 5 is performed in order to extract the code image from the received image, extract feature points of the code image, and search for a center of each color cell. The preprocess operation S505 is performed by generating a gray scale image from a color image and using the gray scale image. In detail, the preprocess operation S505 includes a binarization operation S600, a noise reduction operation S610, a boundary rectangle search operation S620, a vertices detection operation S630, and a color cell center search operation S640.

(1) The Binarization Operation S600

A binarization is used to separate a code image from a background or objects around a code, and reduce a complexity of operations for detecting feature points of the code image. In the binarization operation S600, each pixel of an original image is converted to black and white colors using brightness information of the pixels. If a brightness value of a pixel is higher than a threshold value, the pixel is converted to white and if a brightness value of a pixel is lower than a threshold value, the pixel is converted to black. A conventional binarization of an image is represented in black and white colors; however, the binarization of the present invention may be represented in other colors.

(2) The Noise Reduction Operation S610

In the noise reduction operation S610, a boundary of each object in the binarized original image is detected, and the original image is divided into an area, which is a code image, and an area, which is not a code image, along the detected boundary. Here, the basis for dividing the two areas may be length (circumference length) of the boundary, form of the object, or the like.

(3) The Boundary Rectangle Search Operation S620

In order to extract the code image from the received original image, a center of a code is predicted and a boundary rectangle of the code image is searched for based on the center of the code. Accordingly, the entire code image is divided into n blocks and a block having the largest number of pixels located in each block is searched for.

(4) The Vertices Detection Operation S630

The feature points of the code image denote pixels reflecting characteristics of the code image. Examples of the feature points include vertices of a rectangle of a color code, four vertices of finder patterns of a QR code, an alignment pattern, and a timing pattern. If the code image is in a determinate form or an indeterminate form, the feature points may be expressed in a segment, such as an outline set. The feature points of the code image can be easily found from the extracted code image using a conventional feature point extraction method, such as a matching method or a geometrical distance operation, and can be more easily found by referring to a recognition method of each code.

(5) The Color Cell Center Search Operation S640

Since a color code is formed of color cells, a color is classified by extracting color pixels from the center of each color cell.

Figure 7:
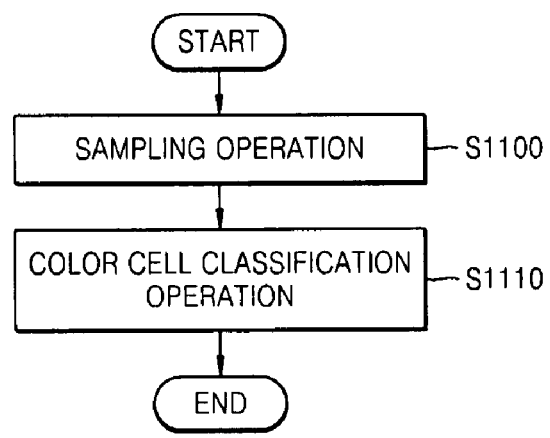
FIG. 7 is a flowchart of a color classification operation of the method of decoding a color based image code according to an embodiment of the present invention.

FIG. 7 is a flowchart of the color classification operation S525 of the method of decoding a color based image code of FIG. 5, according to an embodiment of the present invention.

Referring to FIG. 7, when the center of each color cell of the color based image code is found in the preprocess operation S505 (refer to FIG. 6), the color classification operation S525 is performed. The color classification operation S525 includes a sampling operation S1100, which samples the number of color pixels of each color cell based on the center of each color cell, and a color cell classification operation S1110, which classifies a color of each color cell.

Figure 8:
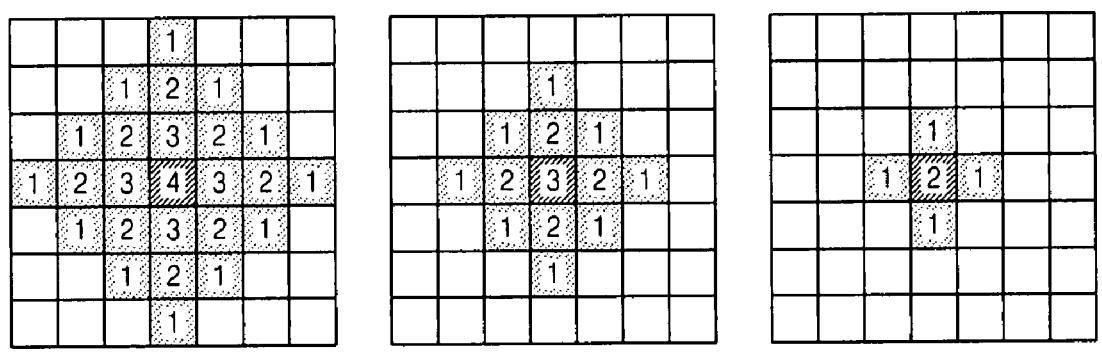
FIG. 8 are diagrams for describing a sampling operation of the color classification operation, according to an embodiment of the present invention.

FIG. 8 are diagrams for describing the sampling operation S1100 of the color classification operation 525, according to an embodiment of the present invention. Referring to FIG. 8, the number of the pixels sampled from each color cell is different according to the size of the received code image.

In the present invention, a max channel based clustering (MCC) method, a white balance based color clustering (WBCC) method, a single-linkage algorithm based color classification (SLACC) method, and a K-means algorithm based color classification (KMACC) method are used to classify a color cell. Using the above methods, various colors can be classified, however, in the present invention, the colors are limited to four colors, i.e., black, red, blue, and green, for a convenient description.

(A) The MCC Method

Figure 9:
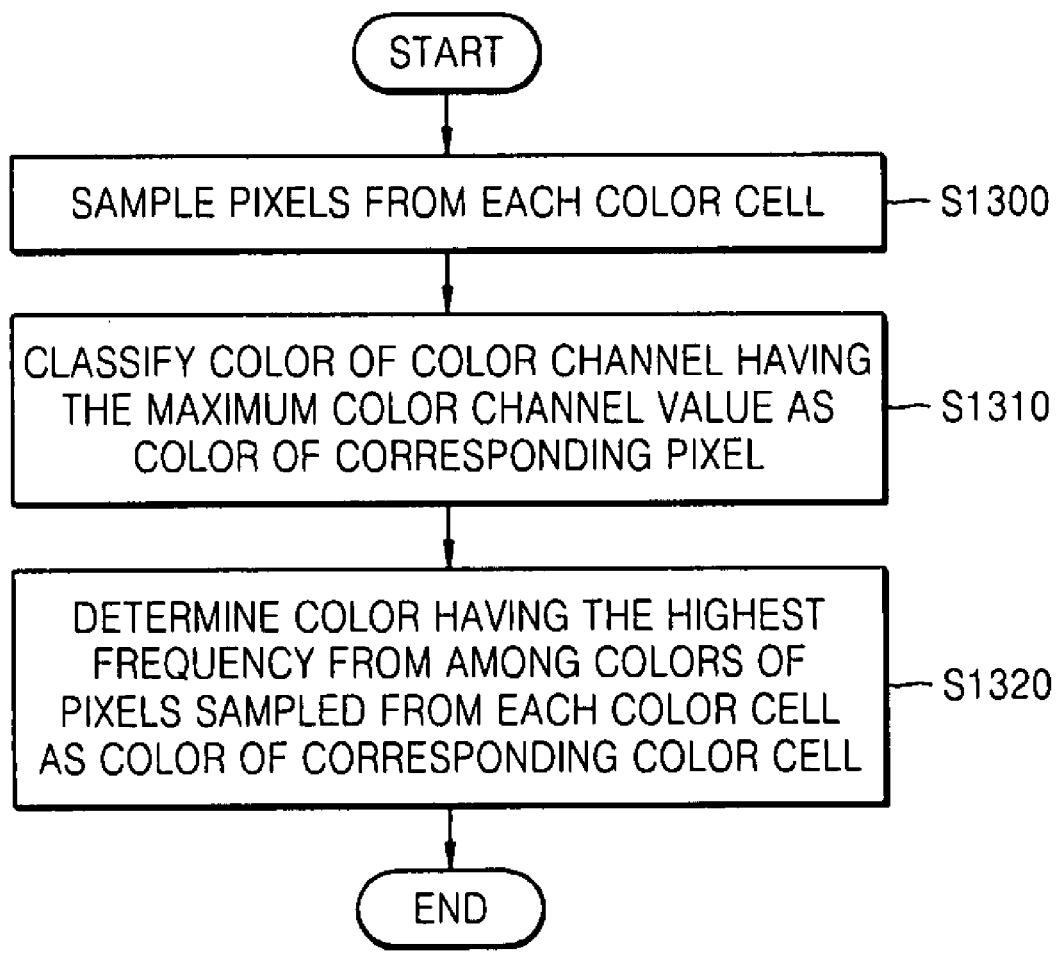
FIG. 9 is a flowchart of a method of classifying colors of a color based image code using a max channel based clustering (MCC) method, according to an embodiment of the present invention.

FIG. 9 is a flowchart of a method of classifying colors of a color based image code using the MCC method, according to an embodiment of the present invention. Referring to FIG. 9, a predetermined number of pixels are sampled from each color cell in operation S1300 as described in FIG. 8, and the MCC method is applied to the sampled number of pixels. Hereinafter, the MCC method will be described in detail.

A color pixel or a color cell includes red, green, and blue color channels, and each color channel has a value from 0 to 255. The MCC method predicts a color of a color channel having the largest value from among color channels of pixels sampled from the color cell as a color group of the corresponding pixel of the color cell. Also, a threshold value $T_{PID}$ that is used during the binarization operation S600 from the preprocess operation S505 is used in order to classify black. When the number of pixels sampled from each color cell is n, an i-th pixel is $p_i = (r_i, g_i, b_i)^T$, a maximum color channel value is $max_i = max(r_i, g_i, b_i)$, a middle channel value is $mid_i = mid(r_i, g_i, b_i)$, and a threshold value classifying each color is T, a color classification function $f_{MCC}$ is as follows.

$$max_i = max(r_i, g_i, b_i) \text{ and} \quad \text{[Equation 1]}$$
$$mid_i = mid(r_i, g_i, b_i), i = 1, 2, \ldots, n \text{ then}$$

$$f_{MCC}(P_i) = \begin{cases} \text{black} & \text{where } (max_i < T_{PID} \text{ and } max_i - mid_i < T_{K1}) \text{ or } max_i < T_{K2} \\ \text{red} & \text{where } max_i = r_i \text{ and } max_i - mid_i > T_R \\ \text{green} & \text{where } max_i = g_i \text{ and } max_i - mid_i > T_G \\ \text{blue} & \text{where } max_i = b_i \text{ and } max_i - mid_i > T_B \\ \text{unknown} & \text{otherwise} \end{cases}$$

In the MCC method, a color of each pixel sampled from one color cell, that is, a color from among red, green, and blue, is classified in operation S1310 and a color having the highest frequency is considered as a color of the corresponding color cell in operation S1320. The MCC method can classify a color by setting $T_{MCCj} = \{T_j, T_{K1i}, T_{K2i}, T_R, T_G, T_B\}$ and j=PID, and thus, the MCC method is advantageous if the characteristics of an image are known.

On the other hand, the performance of the MCC method decreases if the characteristics of elements, such as lighting and printing media, are unknown. Accordingly, in order to improve the performance of the decoder, several sets of a threshold value T are set in one PID, and a color is classified accordingly. For example, when $T_{K2}$ is a set having several elements, a set of a k-th threshold value T having a j-th PID is as follows.

$$T_{MCCjk} = \{T_j, T_{k1i}, T_{K2ik}, T_{Rj}, T_{Gj}, T_{Bj}\}, T_{K2j} = \{T_{K2j1}, T_{K2j2}, T_{K2j3}\}, j=1,2,3 \quad \text{[Equation 2]}$$

The MCC method can be performed quickly since the MCC method is a very simple algorithm.

(B) The WBCC Method

Figure 10:
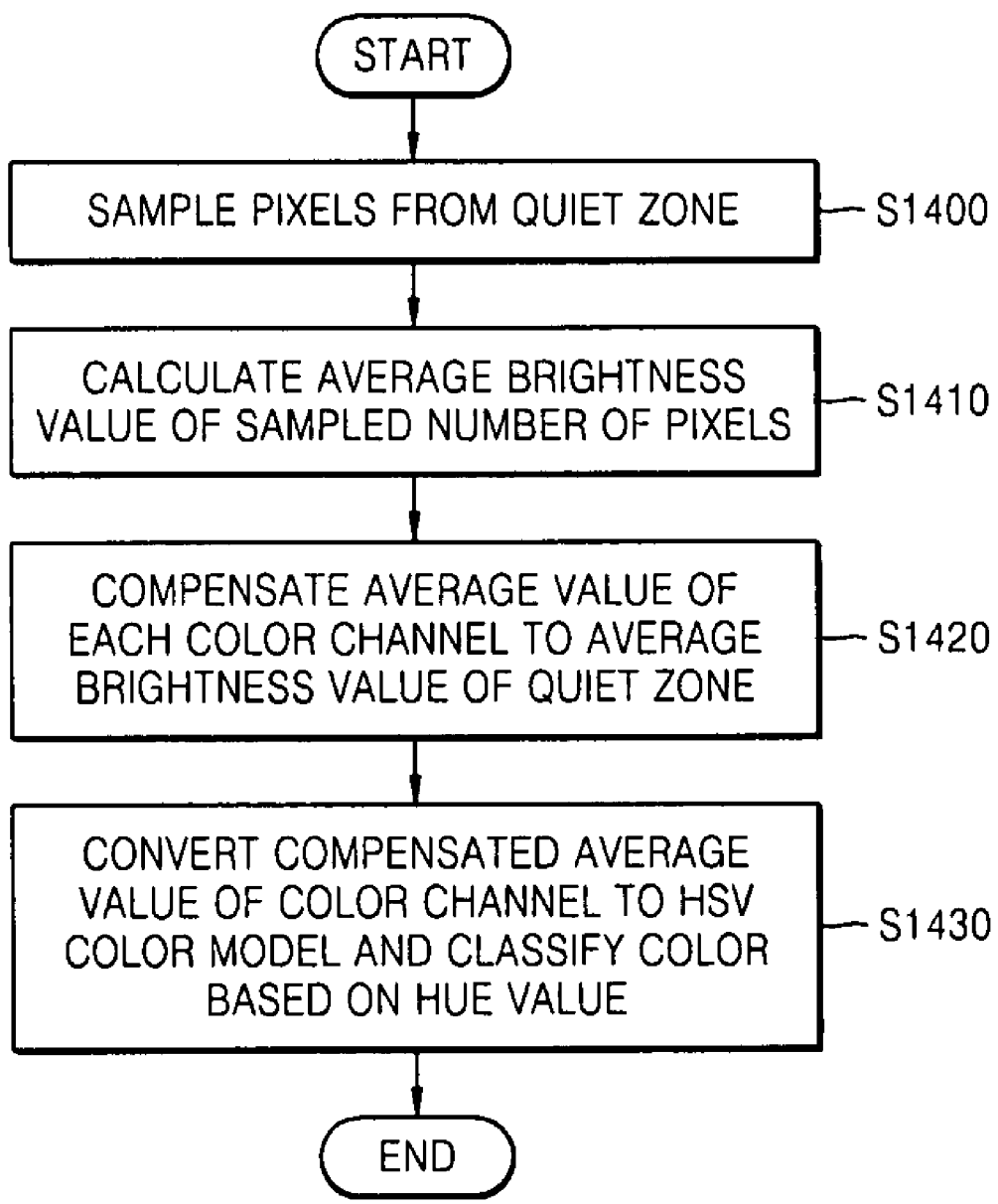
FIG. 10 is a flowchart of a method of classifying colors of a color based image code using a white balance based color clustering (WBCC) method, according to an embodiment of the present invention.

FIG. 10 is a flowchart of a method of classifying colors of a color based image code using the WBCC method, according to an embodiment of the present invention.

The WBCC method classifies colors of color cells using a quiet zone around a code image. The size of the quiet zone around the code image is at least one color cell. The quiet zone is white and reflects color changes in terms of lighting and a printing media. The WBCC method includes a white patch operation and a color classification operation S1430.

(1) White Patch Operation

Since the color of the quiet zone is white, the characteristics of lighting or a camera can be predicted using the quiet zone. The WBCC method regulates values of color channels of color cells. The WBCC method is similar to a gray world assumption (GWA) method, which is one of the color correction algorithms, however, the WBCC method uses the brightness values of pixels of the quiet zone instead of an average brightness value of the entire original image.

Assuming that color information of an i-th color cell from among n color cells forming the color based image code is $P_i = (\bar{r}_i, \bar{g}_i, \bar{b}_i)^T$. Here, $P_i$ can be obtained by sampling several pixels from the corresponding color cell, and then, calculating an average value of each of red, green, and blue color channels of the pixels. Similarly, when m pixels are sampled from the quiet zone in operation S1400 and the sampled j-th pixels are $P_{wj} = (r_{wj}, g_{wj}, b_{wj})^T$, where j=1, 2, . . . , m, the average value of each color channel and a brightness value of the corresponding pixels can be obtained by Equation 3 in operation S1410.

$$\bar{r}_w = \frac{1}{m} \sum_{j=1}^{m} r_{wj}, \quad \text{[Equation 3]}$$

$$\bar{g}_w = \frac{1}{m} \sum_{j=1}^{m} g_{wj},$$

$$\bar{b}_w = \frac{1}{m} \sum_{j=1}^{m} b_{wj},$$

$$\bar{P}_w = \frac{\bar{r}_w + \bar{g}_w + \bar{b}_w}{3}$$

Similarly, when a vector of an average value of each color channel of pixels sampled from an i-th color cell is $P_i = (\bar{r}_i, \bar{g}_i, \bar{b}_i)^T$, a coefficient for color compensation and a color vector $P_{ci}$ that is compensated using the coefficient can be obtained by Equation 4 in operation S1420.

$$\rho_{rw} = \frac{\bar{r}_w - \bar{P}_w}{\bar{r}_w} = 1 - \frac{\bar{P}_w}{\bar{r}_w}, \quad \text{[Equation 4]}$$

$$\rho_{gw} = 1 - \frac{\bar{P}_w}{\bar{g}_w}$$

$$\rho_{bw} = 1 - \frac{\bar{P}_w}{\bar{b}_w}$$

$$P_{ci} = \begin{bmatrix} r_{ci} \\ g_{ci} \\ b_{ci} \end{bmatrix} = \begin{bmatrix} \bar{r}_i \\ \bar{g}_i \\ \bar{b}_i \end{bmatrix} - \begin{bmatrix} \rho_{rw} & 0 & 0 \\ 0 & \rho_{gw} & 0 \\ 0 & 0 & \rho_{bw} \end{bmatrix} \times \begin{bmatrix} \bar{r}_i \\ \bar{g}_i \\ \bar{b}_i \end{bmatrix}^T$$

$$= \begin{bmatrix} \bar{P}_w/\bar{r}_w & 0 & 0 \\ 0 & \bar{P}_w/\bar{g}_w & 0 \\ 0 & 0 & \bar{P}_w/\bar{b}_w \end{bmatrix} \times \begin{bmatrix} \bar{r}_i \\ \bar{g}_i \\ \bar{b}_i \end{bmatrix}^T$$

(2) The Color Classification Operation S1430

The WBCC method uses a color model, which can extract color tone information after the white patching operation. Examples of the color model includes hue, saturation, and value (HSV), hue, saturation, and intensity (HSI), YIQ, International Commission on Illumination (CIE), cyan, magenta, yellow, and key (CMYK), etc. The classifying of colors using HSV is as follows. A color vector $P_{ci}$ of a color compensated color cell is a red, green, and blue (RGB) color model, and the color vector $P_{ci}$ is converted to a corresponding HSV color model $P_{chi}(h_{ci}, S_{ci}, V_{ci})$. In HSV, a hue value $h_{ci}$ is expressed in a range of an angle ($0 \leq h_{ci} < 360$), and since red=0, green=120, and blue=240, each color can be classified according to how close the hue value $h_{ci}$ is to the value of red, green, and blue. Also, if the color is black, a difference between the RGB color channel values is small, and thus, it can be assumed that brightness difference from white is large. Accordingly, a color classification function of the i-th color cell is as follows.

$$f_{WBCC}(\overline{P_i}, P_{ci}, \overline{P_w}) = \begin{cases} black & where & (\max(P_{ci}) - \min(P_{ci}) < T_{hK1}), \\ & & (\max(\overline{P_w}) - \max(\overline{P_i}) > T_{hk2}) \\ red & where & (T_{hB} < h_{ci} \leq 360 \text{ or} \\ & & 0 < h_{ci} \leq T_{hR}) \end{cases}, \text{ not black}$$
$$green \quad where \quad T_{hR} < h_{ci} \leq T_{hG}, \quad \text{not black}$$
$$blue \quad where \quad T_{hG} < h_{ci} \leq T_{hB}, \quad \text{not black.}$$

[Equation 5]

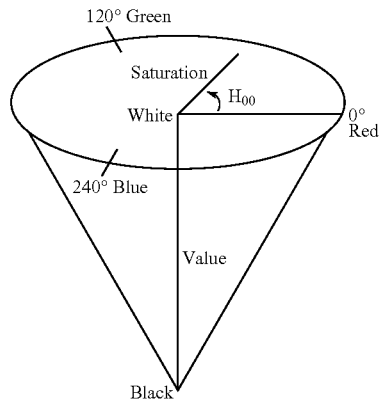

The performance of the WBCC method is high if a white quiet zone exists. However, if the quiet zone is damaged because a code image area is blurred or if a medium in which a code is printed is not white or colored, white pixel information is damaged, and thus, the performance of the WBCC method deteriorates.

In this case, the HSV color model is used in the color classification operation S1430 of the WBCC method, however, the WBCC method can use the MCC method described above or a KMACC method and a SLACC method, which will be described afterwards, after a color is compensated. Accordingly, the color compensation is the special feature of the WBCC method, and the color classification can be combined with other methods.

(C) The SLACC Method

In order to classify a color of a color cell, a hierarchical clustering method may be used. The hierarchical clustering method gradually divides one cluster into detailed clusters. In the current embodiment, a single-linkage algorithm (SLA) is used as the hierarchical clustering method.

Figure 11:
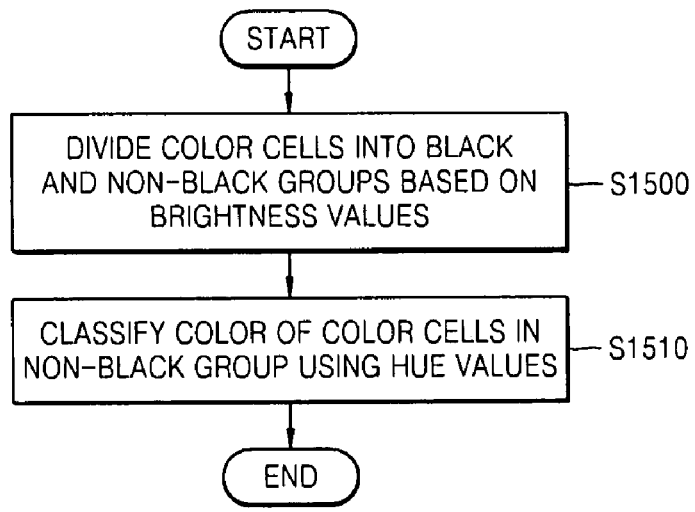
FIG. 11 is a flowchart of a method of classifying colors of a color based image code using a single-linkage algorithm based color classification (SLACC) method, according to an embodiment of the present invention.

FIG. 11 is a flowchart of a method of classifying colors of a color based image code using the SLACC method, according to an embodiment of the present invention.

A color classification of the color based image code is performed by merging predetermined color clusters according to color information of each color cell. If each color cell is mapped in an arbitrary color space using the color information, color clusters are formed according to closeness of the color cells. Here, adjacent color cells in a color cluster have a relatively close distance to each other, and adjacent color cells in different color clusters have a relatively long distance with respect to each other. Such distance can be determined by red, green, and blue color channel values in a RGB color space, and by brightness, saturation, hue values in a HSV color space. However, if a color model according to the present invention is applied, a distance on color coordinates of elements of an image code located on a 3D space is calculated and color clusters having the minimum distance are merged.

This is more complex than a clustering operation in a 1D or 2D space, and several color clusters should be classified. Accordingly, in the present invention, a clustering operation is performed according to brightness information and according to hue information. Consequently, the clustering operation is performed on 1D space.

The SLACC method uses the SLA, which is a hierarchical clustering method, in order to classify a color. The SLA is also known as a minimum method or a nearest neighbor method, which selects the shortest distance from among distances between an element in one group and an element in another group while calculating a distance between two groups.

In the SLACC method, when $C_i$ and $C_j$ are color clusters, and x and y are samples, a distance between color clusters can be obtained as follows.

$$f_{SLACC}(C_i, C_j) = \min_{x \in C_i, y \in C_j} d(x, y) = \min_{x \in C_i, y \in C_j} |x - y| \quad \text{[Equation 6]}$$

The brightness of achromatic color cells is darker than the brightness of chromatic color cells, and hue of each color of the chromatic color cells, such as red, green, and blue, is different. Also, a distance between pixels in the same color group is closer than a distance between pixels in different color groups.

The SLACC method includes two steps. In Step 1, color cells are aligned according to brightness, and then divided into an achromatic color group and a chromatic color group by calculating the color cells having the largest distance between brightness values of adjacent color cells. In Step 2, the color cells are divided into red, green, and blue similarly to Step 1 by using hue of color cells in the chromatic color group. Details about each step are as follows.

Step 1: Divide color cells into an achromatic color group and a chromatic color group using the SLA (operation S1500)

Assuming that color information of an i-th color cell $P_i$ from among n color cells of the color based image code is $\overline{P_i} = (\overline{r_i}, \overline{g_i}, \overline{b_i})^T$ and a hue value of the i-th color cell $P_i$ is $\mu_i = (\overline{r_i} + \overline{g_i} + \overline{b_i})/3$, i=1, 2, . . . , C. Also, assuming that the number of color clusters that is required to be obtained is m. A conventional process of clustering m color clusters according to a brightness value is as follows.

First, hue values of all color cells are aligned in an ascending order in order to obtain $O = \{o_{\mu 1}, o_{\mu 2}, \ldots, o_{\mu j}, o_{\mu j+1}, \ldots, o_{\mu C}\}$, $o_{\mu j} \leq o_{\mu j+1}$. Then, $O_{\mu i}$ is set as a cluster $C_i$. Clusters $C_a$ and $C_b$, which are closest to each other are obtained, and the clusters $C_a$ and $C_b$ are merged. This process is repeated. If m is 3 and white exists, however, gray does not exist, $C_1$ is black, $C_3$ is white, and $C_2$ is chromatic color. Also, if white and gray do not exist, m is 2, $C_1$ is black and $C_2$ is non-black.

If a black cluster is $C_K$ and a non-black cluster is $C_{NK}$, a distance between $C_K$ and $C_{NK}$ can be calculated as follows.

$$f_{SLACC}(C_K, C_{NK}) = \min_{o_{\mu j} \in C_K, o_{\mu j+1} \in C_{NK}} d(o_{\mu j}, o_{\mu j+1}) \quad \text{[Equation 7]}$$

$$= \min_{o_{\mu j} \in C_K, o_{\mu j+1} \in C_{NK}} |o_{\mu j} - o_{\mu j+1}|,$$

$$j = 1, 2, \ldots, C-1,$$

Here, $d(o_{\mu j}, o_{\mu j+1})$ is a distance between $o_{\mu j}$ and $o_{\mu j+1}$, which are aligned adjacent cells.

Step 2: Divide chromatic color cells into red, green, and blue groups using the SLA (operation S1510)

The color cells in $C_{NK}$ are classified by hue values. The color cells are aligned using the hue values of each color cell, and then classified into red, green, or blue using the SLA. When $C_R$ is a red group, $C_G$ is a green group, and $C_B$ is a blue group, the following equation is used.

$$f_{SLACC}(C_R, C_G, C_B) = \quad \text{[Equation 8]}$$

$$\begin{cases} \text{red where} & \min_{o_{h_i} \in C_K, o_{h_i+1} \in C_G} d(o_{kj}, o_{kj+1}) o_{kj} < 60 \text{ or} \\ & \min_{o_{h_{i+1}} \in C_K, o_{h_i} \in C_B} d(o_{kk+1}, o_{kk}), o_{kk+1} \geq 300 \\ \text{green where} & \min_{o_{h_i} \in C_G, o_{h_i+1} \in C_B} d(o_{kj}, o_{kj+1}) o_{kj} \leq 180 \text{ and} \\ & \min_{o_{h_{i+1}} \in C_G, o_{h_i} \in C_K} d(o_{kk+1}, o_{kk}), o_{kk+1} \geq 60 \\ \text{blue where} & \min_{o_{h_i} \in C_B, o_{h_i+1} \in C_K} d(o_{kj}, o_{kj+1}) o_{kj} < 300 \text{ and} \\ & \min_{o_{h_{i+1}} \in C_B, o_{h_i} \in C_G} d(o_{kk+1}, o_{kk}), o_{kk+1} > 180 \end{cases}$$

In this case, the hue values are arranged from 0° to 360°. Pure red is 0° and also 360°, green is 120°, and blue is 240°. Accordingly, red is located in a range less than 60° or larger than 300°. Also, green is located in a range larger than 60° and less than 180° and blue is located in a range larger than 180° and less than 300°. Accordingly, the hue values can be expressed as Equation 8 above.

If there are 8 colors (red, green, blue, yellow, cyan, magenta, black, and white), the colors can be classified by regulating the basis of an achromatic color and a chromatic color. That is, in Step 1, $C_1$ (black) and $C_3$ (white) groups are obtained by the SLA and $C_2$ is determined as a chromatic color group. Also in Step 2, clusters in the chromatic group $C_2$ are divided based on hue values using the SLA, and color values of color cells are determined according to a color range of each cluster.

For example, if the above 8 colors are classified, 6 colors are in the chromatic group, and thus, the range of hue values are divided into 6. Hence, red is less than 30° or larger than 330°, yellow is between 30° and 90°, and green is between 90° and 150°.

However, such color range is an ideal value, and the color range may change when a color distorts according to a status of an image. Such values of the color range may be pre-obtained via an experiment or applied after compensating colors of color cells via a color compensation operation. The SLACC method does not use a threshold value to classify black, unlike the MCC or WBCC method. The SLACC method is used in the present embodiment since the SLACC method is the simplest method from among hierarchical clustering methods, however, a similar result can be obtained using other hierarchical clustering methods.

(D) The KMACC Method

In order to classify a color, a partitional clustering method can be used, besides the hierarchical clustering method. The partitional clustering method reduces the number of clusters by gradually gathering several clusters. In the current embodiment, a K-means algorithm is used as the partitional clustering method.

Figure 12:
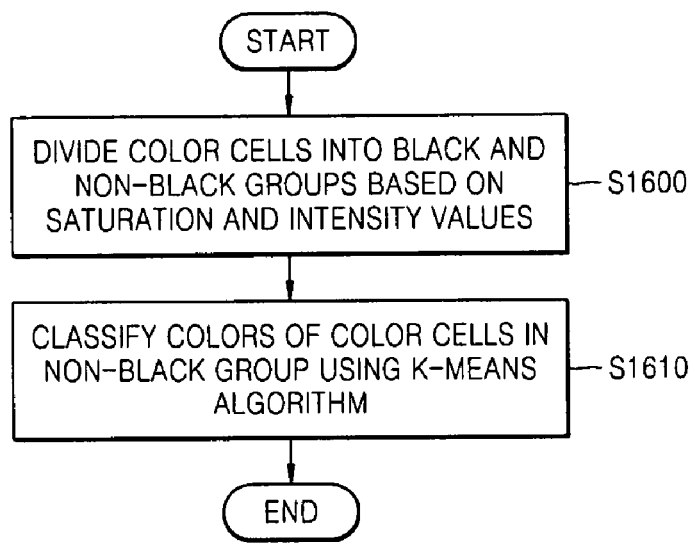
FIG. 12 is a flowchart of a method of classifying colors of a color based image code using a K-means algorithm based color classification (KMACC) method, according to an embodiment of the present invention.

FIG. 12 is a flowchart of a method of classifying colors of a color based image code using the KMACC method, according to an embodiment of the present invention.

A color of a received image is formed of hue, intensity, and saturation as based on a HSV color model. The KMACC method comprises two steps like the SLACC method, however, the KMACC method is different since intensity and saturation are used for dividing color cells into achromatic color cells and chromatic color cells, and a K-means algorithm is used for classifying colors of chromatic color cells while applying hue. The K-means algorithm is one from among well-known clustering methods, and searches for mean vectors $\mu_1, \mu_2, \ldots, \mu_k$ of each cluster when k clusters exist are performed. An alternative K-means algorithm is used in the KMACC method. If the number of color cells is C and pixel information of a color cell is $P=\{P_1, P_2, \ldots, P_C\}$, a procedure is illustrated in Table 1.

TABLE 1

```
begin k-nenas(C, P, k, μ₁,μ₂,...,μₖ)
    i=1
    do while (i <= C)
        classify Pᵢ sample according to nearest μⱼ
        recompute μⱼ
        i = i+1
    end while
    do
        classify P samples according to nearest μⱼ
        recompute μⱼ
    until no change in μⱼ
    return μ₁,μ₂,...,μₖ
end k-means
```

Step 1: Divide color cells into an achromatic group and a chromatic group (operation S1600)

Step 1 includes 3 sub-steps. First sub-step, in order to classify an achromatic color, a clustering according to intensity is performed and then a clustering according to saturation is performed. Then, clusters, which are classified as achromatic color clusters via both clusterings in terms of intensity and saturation, are determined as an achromatic color group since it is assumed that black has relatively low brightness and saturation values under various lighting.

Assuming that the result obtained by aligning hue values of all color cells in an ascending order is $O_M=\{(o_{\mu 1}, o_{\mu 2}, \ldots, o_{\mu c+1}, o_{\mu C}\}$, and the result obtained by aligning saturation values of all color cells in an ascending order is $O_S=\{o_{s1}, o_{s2}, \ldots, o_{sc}, o_{sc+1}, \ldots, o_{sC}\}$. By performing a K-means algorithm, an initial value is a minimum value and a maximum value, and an average value changes according to the result of performing the K-means algorithm. Accordingly, an achromatic color cluster is obtained using the following procedure.

Step 1-1: Divide color cells into an achromatic color cluster $A_{1K}$ and a chromatic color cluster $A_{1NK}$ according to an intensity value (C, $O_M$, k=2, $\mu_1=o_{\mu 1}$, $\mu_2=o_{\mu C}$)

Step 1-2: Divide color cells into an achromatic color cluster $A_{2K}$ and a chromatic color cluster $A_{2NK}$ according to a saturation value (C, $O_S$, k=2, $\mu_1=o_{s1}$, $\mu_2=o_{sC}$)

Step 1-3: Classify the common color cells in the achromatic color clusters divided from the above Steps 1-1 and 1-2 as final black clusters $A_{1K} \cap A_{2K}$, and the remaining color cells as non-black clusters $A_{NK} (A_{1K} \cap A_{2K})^C$.

Step 2: Divide chromatic color cells into red, green, and blue groups (Operation S1610)

By applying the K-means algorithm to hue values of the color cells in $A_{NK}$, each color cell is classified as red, green, or blue. Assuming that $O_{ki}$ is a hue value of an i-th color cell in $A_{NK}$, the number of color cells is C', and average estimation values of red, green, and blue clusters are respectively $\mu_R, \mu_G, \mu_B$. Since an initial value of an average value of a cluster, in which the K-means algorithm is to be applied, should be an ideal value, the K-means algorithm is K-means (C', $A_{NK}$, k=3, $\mu_R$=0, $\mu_G$=120, $\mu_B$=240) $P'_{hi} \in A_{NK}$, i=1, 2, ..., C'. A color classification function using the above result is as follows.

$$f_{KMACC}(P'_{hi}) = \begin{cases} \text{red} & \text{where} \quad d(\mu_R - o'_{hi}) = \min\{d(\mu_R - o'_{hi}), d(\mu_G - o'_{hi}), d(\mu_B - o'_{hi})\} \\ \text{green} & \text{where} \quad d(\mu_G - o'_{hi}) = \min\{d(\mu_R - o'_{hi}), d(\mu_G - o'_{hi}), d(\mu_B - o'_{hi})\} \\ \text{blue} & \text{otherwise} \end{cases}$$

[Equation 9]

In the above example, since the number k of groups while classifying chromatic colors is 3, each color cell is bound in 3 groups and a center value of each group can be obtained according to the procedure of Table 1. Since the center value of each group is a hue value of the corresponding group, when a HSV color model is used, a group having the center value closest to 0° is the red group, a group having the center value closest to 120° is the green group, and a remaining group is the blue group.

Like the SLACC method, the number of types of color classification can be increased based on the number of subgroups in each chromatic color group and achromatic color group in the KMACC method. For example, when the K-means algorithm is applied in the achromatic color classification operation, the color cells can be classified as black, white, and chromatic groups when k=3 since it can be assumed that a group having the highest center value (brightness value) is the white group, a group having the lowest center value is the black group, and a remaining group is the chromatic color group.

In case of chromatic colors, when k=6, the color cells can be divided into red, green, blue, cyan, yellow, and magenta groups, like the SLACC method. since the 6 groups can be classified based on how close the center values (hue values) of 6 groups are respectively to 0°, 120°, 240°, 60°, 180°, and 300°.

An intensity value is used for dividing an achromatic color and a chromatic color, however, a saturation value, or both intensity value and saturation value with weights may be used. A saturation value of a color shows how clear the color is, and the saturation value is low when the color is an achromatic color and visa versa. The intensity value and the saturation value vary according to an applied color models. In the present invention, two color models are used, which are an RGB color model and an YUV (a type of YIQ) color model because these color models are conventional color models provided by a camera or a built-in apparatus. An intensity value and a saturation value in the i-th color cell are defined as follows.

KMACC (RGB) [Equation 10]

$$\text{intensity: } \mu_\varepsilon = \frac{(\overline{r_i} + \overline{g_i} + \overline{b_i})}{3}, i = 1, 2, \ldots, C$$

$$\text{saturation: } \sigma_i = \sqrt{\frac{((\overline{r_\varepsilon} - \mu_i)^2 + (\overline{g_i} - \mu_i)^2 + (\overline{b_i} - \mu_i)^2))}{3}},$$

$$i = 1, 2, \ldots, C$$

KMACC (YUV)

$$\text{intensity: } \mu_i = 0.3\overline{r_i} + 0.59\overline{g_i} + 0.11\overline{b_i},$$

$$i = 1, 2, \ldots, C$$

-continued $$\text{saturation: } \sigma_i = \sqrt{\frac{(-0.3\overline{r_i} - 0.59\overline{g_i} + 0.89\overline{b_i})^2 +}{(0.7\overline{r_i} - 0.59\overline{g_i} - 0.11\overline{b_i})^2}},$$

$$i = 1, 2, \ldots, C$$

When both the intensity value and the saturation value are used, an achromatic color can be classified according to the intensity value, and then according to the saturation value. Color cells classified as achromatic colors in both cases belong to an achromatic group. The intensity value and the saturation value may be differently weighted.

(E) The Color Channel Scaling Method

The color classification algorithms described above are used in order to compensate colors of a received image to colors that are expected to be obtained under ideal lighting. Also, the color classification algorithms can be used to classify colors obtained under various lighting, such as daylight, light bulbs, halogen lighting, and florescent lighting, in a mobile computing environment.

In order to compensate a color, the WBCC method uses a white patch method before classifying a color, however, the SLACC method and the KMACC method use a color channel scaling method. Unlike the WBCC method, the SLACC and KMACC methods do not use color information of pixels in a quiet zone, and thus, do not use the white patch method. However, the white patch method can still be applied to the SLACC and KMACC methods.

The SLA method can be ideally applied when a distance between clusters is larger than a distance between elements in a cluster, despite of a color change by lighting, a camera, and a printing medium. However, when red, green, blue color channel values received from a camera are affected by a color change, information regarding brightness and hue values is also affected by the color change. Accordingly, when the color change is noticed, an algorithm for compensating a color change is required. An example of such algorithm is a color channel scaling method.

Assuming that the number of color cells of a color code is C, an index of each color cell is i, an index of the color channel is j, when j is 1 the color channel is a red channel, when j is 2 the color channel is a green channel, and when j is 3 the color channel is a blue channel. Also, $I_{ij}$ is color channel information of each color cell. That is, $I_{i1}$, is a red channel value of an i-th color cell. Accordingly, the maximum and minimum values of each color channel are respectively $\max_j$ and $\min_j$, the maximum and minimum color channel values are respectively $\max_{Int}$ and $\min_{Int}$, and the lowest value from among the maximum values of each color channel is $\min\max_{Int}$. When a channel value of the i-th color cell is $P_i = (\overline{r_i}, \overline{g_i}, \overline{b_i})^T = (l_{i1}, l_{i2}, l_{i3})^T$, $\max_j$, $\min_j$, $\min_{Int}$, and $\min\max_{Int}$ can be obtained as follows.

$$\max_j = \max_{i=1}^{C}(l_{ij}), \min_j = \min_{i=1}^{C}(l_{ij}), j = 1,2,3 \quad \text{[Equation 11]}$$

$$\max_{Int} = \max_{j=1}^{3}(\max_j),$$

$$\min\max_{Int} = \min_{j=1}^{3}(\max_j),$$

$$\min_{Int} = \min_{j=1}^{3}(\min_j)$$

Hence, when an invariable number, for applying the color channel scaling method, is a scaling threshold value (ST), a result of scaling each color channel, that is, a result of compensating a color change is as follows.

$$l'_{ij} = \min_{Int} + \frac{(l_{ij} - \min_j)}{(\max_j - \min_j)} \times (\max_{Int} - \min_{Int}), \quad \text{[Equation 12]}$$

where $$l'_{ij} \in P'_i, \max_{Int} \geq ST \times \min\max_{Int}$$

In other words, a range of all color channels can be uniformly increased to the minimum color channel value and the maximum color channel value. The color channel scaling method for compensating a color change is applied before performing the SLACC or KMACC method.

An achromatic color and a chromatic color of a color code can be classified by applying various clustering methods. In the present invention, the SLACC method and the K-means algorithm are used, however, similar methods can be applied as well. For example, as a partitional clustering method, a fuzzy c-means or a QT clustering algorithm can be applied instead of the K-means algorithm. Also, as a hierarchical clustering method, a Ward's method, an average linkage algorithm, or a complete linkage algorithm may be applied instead of the single linkage algorithm. Besides, an elbow criterion method, a spectral clustering method, an artificial intelligence method, or a Bayesian method can be used.

Figure 13:
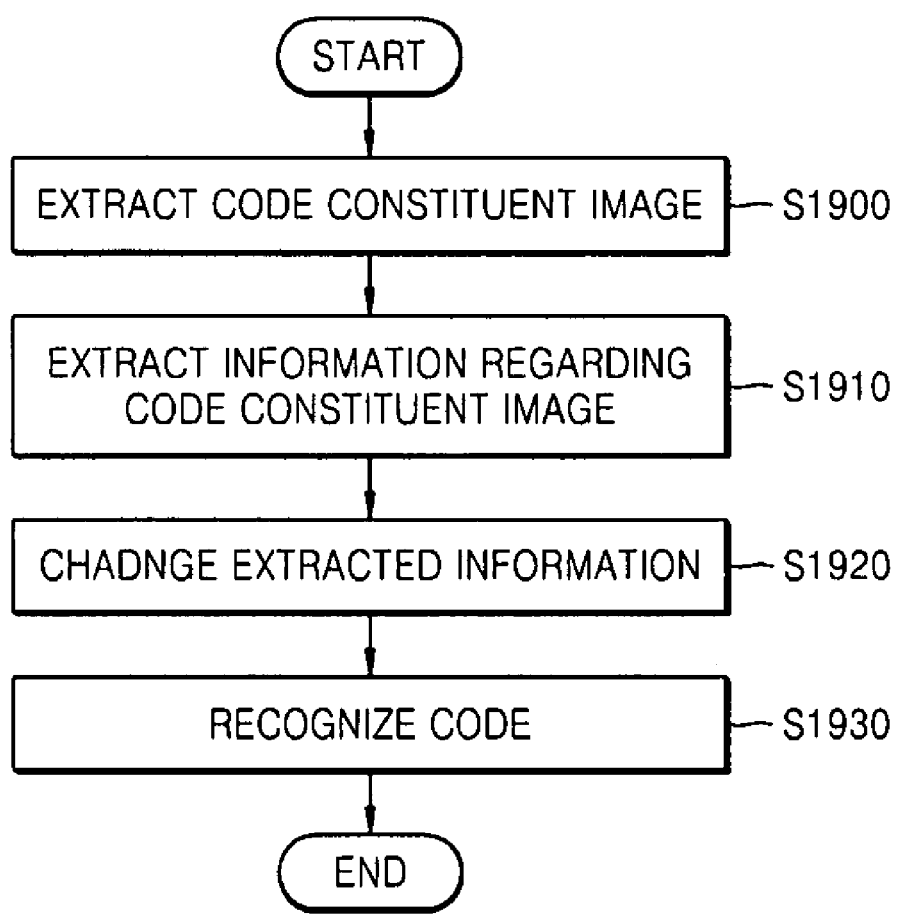
FIG. 13 is a flowchart of a code recognition operation of the method of decoding a color based image code according to an embodiment of the present invention.

FIG. 13 is a flowchart of the code recognition operation S555 of the method of decoding a color based image code, according to an embodiment of the present invention.

Referring to FIG. 13, when classifying a color of each color cell is completed and an error is corrected, and a code constituent image (color cell) is extracted in operation S1900. A code image is formed of code constituent images according to characteristics of the code image. A color code is formed of color cells, and a mixed code is represented in a specific form showing information, a pattern, a color, or a shade. A QR code is formed of a finder pattern, an alignment pattern, a version pattern, an error correction level pattern, a data codeword area, an error correction codeword area, etc.

The code constituent image may not be the constituent of the corresponding code, and can be extracted after being changed into information showing characteristics of the corresponding constituent. For example, in case of a QR code, which is a 2D black code, only locations of a center point of each finder pattern, a center point of an alignment pattern, a center point of a timing pattern, and a center point of each color cell in the data codeword area may be extracted. Similarly, in case of a color code, only information regarding a location of center point of each color cell may be extracted. In case of a mixed code, which is formed of the combination of a pattern, a color, and a shade, only center points of color cells according to the pattern, color, and shade, or location information of pixels representing each area may be extracted. Accordingly, an original image should be referred to when information regarding a color and shade is required like a mixed code.

Then, information regarding the code constituent image (color cell) is extracted in operation S1910.

Based on the location information obtained in operation S1900, a form, pattern, color, and shade of the corresponding constituent image is obtained from the original image. Accordingly, in case of a color code or a 2D image code, information regarding a color, shade, etc. of an area can be obtained by extracting the area in a predetermined width based on the center point of the corresponding color cell. Also, when pattern information, such as PDF-417, should be used, pixel information of the corresponding code image is obtained in a uniform interval. The pixel information may be regarding the entire pixels or about the length of the pixels on a predetermined scan line. Also, the pixel information may be obtained by sampling pixels on a code image in an interval smaller or equal to the minimum length pattern forming the code image.

After extracting the information, the extracted information is converted to a predetermined value, such as a corresponding character, number, or symbol in operation S1920. In case of a barcode or a 2D code, the extracted information may be regarding an arrangement of pattern length information or black and white colors of each color cell. In case of a color code, the extracted information may be regarding the kinds of colors of each color cell, and in case of a logo, the extracted information may be regarding an outline form.

Then, a code is recognized in operation S1930. In operation S1930, a decoding can be performed according to the characteristics based on a type of code. Accordingly, a corresponding method of decoding each code, such as a QR code, a barcode, a color code, a mixed code (refer to Korean Patent Application No. 2005-0025240), a maxicode, a data matrix code, an intercode, etc., is used.

The method of classifying colors of a color based image code according to the present invention may further include an image expressing medium information inputting operation, a lighting information inputting operation that selects a type of lighting, and a lighting outputting operation.

(1) The Image Expressing Medium Information Inputting Operation

When inputting a code, a type of medium in which the code is represented is selected and inputted. When the medium is an electrical medium, such as a cathode ray tube (CRT), a liquid crystal display (LCD), or a digital TV, or a printing medium, such as a newspaper, a magazine, or a plastic, different color changes may occur, and thus, a clue for compensating a changed color is provided. In this case, an operation to compensate for a medium using a coefficient for compensation is additionally applied while compensating color and shade changes of a code image.

(2) The Lighting Information Inputting Operation which Selects a Type of Lighting When inputting a code, a type of lighting in which a code is recognized is selected and inputted. If the lighting is a cool white fluorescence (CWF) lighting, a separate compensation of a color change is not required. However, in case of lighting, such as a halogen or INC-A, red is emphasized. Accordingly, such information may be additionally inputted in order to compensate a color change. In this case, an operation of compensating lighting using a coefficient for compensation, which can compensate a corresponding characteristic of the lighting, is additionally applied while compensating color and shade changes of a code image.

(3) The Lighting Outputting Operation

Lighting built in a reader may be turned on or off or lighting may be outputted to the code image. This operation is particularly useful in a dark environment or if the code image covers the reader.

The invention can also be embodied as computer readable codes on a computer readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention, even when a color, shade, or form of a color based image code is distorted by the characteristics of a camera or a printing medium, the color based image code can be changed to its original color or shade, and noise can be compensated. Accordingly, the color based image code can be accurately recognized. Also, using the present invention, a color can be recognized quickly and easily in a low performance computing environment since information regarding color and shade of a quiet zone or color based image code is used.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of classifying colors of a color based image code, the method comprising:
    sampling a predetermined number of pixels from a white quiet zone which exists around the color based image code;
    obtaining an average value of each color channel and an average brightness value of the sampled number of pixels;
    obtaining a coefficient for color compensation using a ratio of the average value of each color channel to the average brightness value;
    compensating an average value of the color channels of each cell forming the color based image code using the coefficient for color compensation; and
    changing the compensated average value of the color channels of each cell to a color model capable of hue extraction, and classifying a color of each cell based on intensity and hue values of the color model capable of hue extraction.

2. The method of claim 1, wherein the color model capable of hue extraction is any one of color model from among HSV, HIS, CMYK, RGB, YIQ, and CIE color models capable of hue extraction.

3. The method of claim 1, wherein the obtaining of the average brightness value comprises:
    obtaining the average value of each color channel of the sampled number of pixels; and
    obtaining the average brightness value by dividing the total of the average values of the color channels by the number of color channels.

4. The method of claim 1, wherein the compensating of the average value comprises:
    sampling a predetermined number of pixels from each cell forming the color based image code;
    obtaining an average value of each color channel of the sampled number of pixels; and
    compensating the average value of each channel using the coefficient for color compensation.

5. A method of classifying colors of a color based image code, the method comprising:
    obtaining at least one of a brightness value and a saturation value of each cell forming the color based image code and grouping the cells into an achromatic color group and a chromatic color group based on the at least one of the brightness value and the saturation value; and
    classifying colors of cells in the chromatic color group using a hue of a color model capable of hue extraction;
    further comprising before the grouping of the cells, scaling color channel values of each cell forming the color based image code;
    wherein the scaling of color channel values comprises:
    obtaining a color channel value of each channel; and
    compensating the color channel value of each cell to a new channel value using the following Equation, $$l'_{ij} = \min_{int} + \frac{(l_{ij} - \min_j)}{(\max_j - \min_j)} \times (\max_{int} - \min_{int}), \text{ where}$$

$$l'_{ij} \in P'_i, \max_{Int} \geq ST \times \min\max_{Int}$$

wherein $l_{ij}$ is a value of an j-th color channel of an i-th cell, $\max_j$ and $\min_j$ are respectively the maximum value and the minimum value of the j-th color channel, $\max_{int}$ and $\min_{int}$ are respectively the maximum value and the minimum value of the entire values of the color channels, and ST is a scaling threshold value.

6. The method of claim 5, further comprising classifying colors of cells in the achromatic color group into one selected from the achromatic colors consisting of black, white, and gray, using at least one of intensity and saturation of the cells in the achromatic color group.

7. The method of claim 5, wherein the grouping of the cells and the classifying of colors use at least one method from among a hierarchical clustering method, a division clustering method, an elbow criterion method, and a spectral clustering method.

8. The method of claim 7, wherein the division clustering method uses at least one algorithm from among a K-means, a fuzzy c-means, and a QT clustering algorithm.

9. The method of claim 7, wherein the hierarchical clustering method uses at least one algorithm from among a single linkage, a Ward's method, an average linkage, and a complete linkage algorithm.

10. The method of claim 5, wherein the grouping of the cells comprises:
- a first classification operation which groups the cells into the achromatic color group and the chromatic color group based on intensity values of the cells;
- a second classification operation which groups the cells into the achromatic color group and the chromatic color group based on saturation values of the cells; and
- classifying the cells, commonly grouped in the achromatic group from the first classification operation and the second classification operation, as achromatic color cells.

11. The method of claim 10, wherein the first classification operation and the second classification operation comprise obtaining an intensity value and a saturation value of each cell forming the color based image code, aligning the intensity values and the saturation values in an ascending order, and grouping the cells into the achromatic color group and the chromatic color group based on a section having the largest difference between the saturation value and the intensity value.

12. The method of claim 5, wherein the grouping of the cells comprises grouping the groups into the achromatic color group and the chromatic color group based on intensity and saturation of an RGB color model.

13. The method of claim 5, wherein the grouping of the cells comprises grouping the cells into the achromatic color group and the chromatic color group based on intensity and saturation of a YUV color model.

14. The method of claim 5, further comprising before the grouping of the cells:
- sampling a predetermined number of pixels from a quiet zone of the color based image code;
- obtaining an average brightness value of the sampled number of pixels; and
- compensating an average value of color channels of each cell forming the color based image code using the average brightness value of the sampled number of pixels.

15. A non-transitory computer readable recording medium having recorded thereon a program for executing the method of claim 1.

16. A non-transitory computer readable recording medium having recorded thereon a program for executing the method of claim 5.

\* \* \* \* \*